United States Patent
Tsirkin

(10) Patent No.: US 11,228,561 B2
(45) Date of Patent: Jan. 18, 2022

(54) SAFE MAC PROGRAMMING SUPPORT FOR VNIC

(71) Applicant: Red Hat, Inc., Raleigh, NC (US)

(72) Inventor: Michael S. Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 98 days.

(21) Appl. No.: 16/392,023

(22) Filed: Apr. 23, 2019

(65) Prior Publication Data

US 2020/0344206 A1 Oct. 29, 2020

(51) Int. Cl.
*H04L 29/12* (2006.01)
*G06F 9/455* (2018.01)

(52) U.S. Cl.
CPC ...... *H04L 61/2076* (2013.01); *G06F 9/45558* (2013.01); *H04L 61/6022* (2013.01); *G06F 2009/45595* (2013.01)

(58) Field of Classification Search
None
See application file for complete search history.

(56) References Cited

U.S. PATENT DOCUMENTS

| 8,792,502 | B2 | 7/2014 | Rajamanickam et al. | |
| 8,825,864 | B2* | 9/2014 | Li | G06F 8/60 709/226 |
| 8,949,827 | B2 | 2/2015 | Becker et al. | |
| 9,183,046 | B2 | 11/2015 | Tsirkin | |
| 10,044,525 | B2 | 4/2018 | Gaddehosur et al. | |
| 2004/0177265 | A1* | 9/2004 | Ice, Jr. | G06F 21/31 713/2 |
| 2006/0139360 | A1* | 6/2006 | Panesar | G06F 12/109 345/568 |
| 2008/0089338 | A1* | 4/2008 | Campbell | H04L 45/00 370/392 |
| 2015/0128245 | A1* | 5/2015 | Brown | H04L 49/00 726/12 |
| 2015/0149997 | A1* | 5/2015 | Tsirkin | G06F 9/45558 718/1 |
| 2016/0261498 | A1* | 9/2016 | Eastlake, III | H04L 61/2038 |
| 2017/0093794 | A1* | 3/2017 | Natu | H04L 12/4641 |
| 2018/0262459 | A1 | 9/2018 | Wang et al. | |

OTHER PUBLICATIONS

"Enable Use of Hypervisor Assigned MAC Addresses." Palo Alto Networks, Inc., Sep. 19, 2018,docs.paloaltonetworks.com/vm-series/7-1/vm-series-deployment/about-the-vm-series-firewall/enable-use-of-hypervisor-assigned-mac-addresses.
Wright, Chris "RFC: Network Plugin Architecture (NPA) for vmxnet3" May 4, 2018, lists.linuxfoundation.org/pipermail/virtualization/2010-May/015046.html.

* cited by examiner

*Primary Examiner* — Younes Naji
(74) *Attorney, Agent, or Firm* — Haynes and Boone, LLP

(57) ABSTRACT

A method includes, with a hypervisor, receiving a list of device addresses, wherein the list includes at least one approved address, sending a notification to a guest that device address selection is allowed, receiving a first programming request from the guest, wherein the first programming request includes a requested device address, determining that the requested device address matches one of the at least one device address, and in response to the determining, assigning the requested device address to a virtual network device associated with the guest.

20 Claims, 6 Drawing Sheets

SAFE MAC PROGRAMMING SUPPORT FOR VNIC

BACKGROUND

The present disclosure relates generally to virtual computing systems, and more particularly, allowing guests to select a datalink layer address for virtual network devices.

A host machine (e.g., computer or server) is a computing system that is typically enabled to simultaneously run one or more virtual machines, where each virtual machine may be managed by a hypervisor and used by a local or remote client. A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

The virtual machines may include virtual network devices, which are mapped by the hypervisor to a network device included in the host machine. The virtual network device may include a datalink layer address that assists the hypervisor in mapping the virtual network device to the network device included in the host machine.

SUMMARY

According to one example, a method includes, with a hypervisor, receiving a list of device addresses, wherein the list includes at least one approved address, with the hypervisor, sending a notification to a guest that device address selection is allowed, with the hypervisor, receiving a first programming request from the guest, wherein the first programming request includes a requested device address, with the hypervisor, determining that the requested device address matches one of the at least one device address, and with the hypervisor, in response to determining that the requested device address matches one of the at least one approved address, assigning the requested device address to a virtual network device associated with the guest.

According to one example, a method includes, with a guest, receiving a notification from a hypervisor, wherein the notification indicates that device address selection is allowed with the guest, selecting at least one requested device address, with the guest, sending a first programming request to the hypervisor, wherein the first programming request includes the at least one requested device address, and with the guest, receiving an acknowledgment from the hypervisor that the at least one requested device address is approved and the at least one requested device address is assigned to a virtual network device associated with the guest, wherein the approval is based on the at least one requested device address matching at least one approved address included in a list of approved device addresses.

According to one example, a system includes, a processor, and a memory comprising machine readable instructions that when executed by the processor, cause the system to: receive a list of device addresses, wherein the list includes at least one approved address, send a notification to a guest, wherein the notification indicates that device address selection is allowed, receive a first programming request from the guest, wherein the first programming request includes a requested device address, determine that the requested device address matches one of the at least one approved address, and in response to determining that the requested device address matches one of the at least one approved address, assign the requested device address to a virtual network card associated with the guest.

Figure 1:
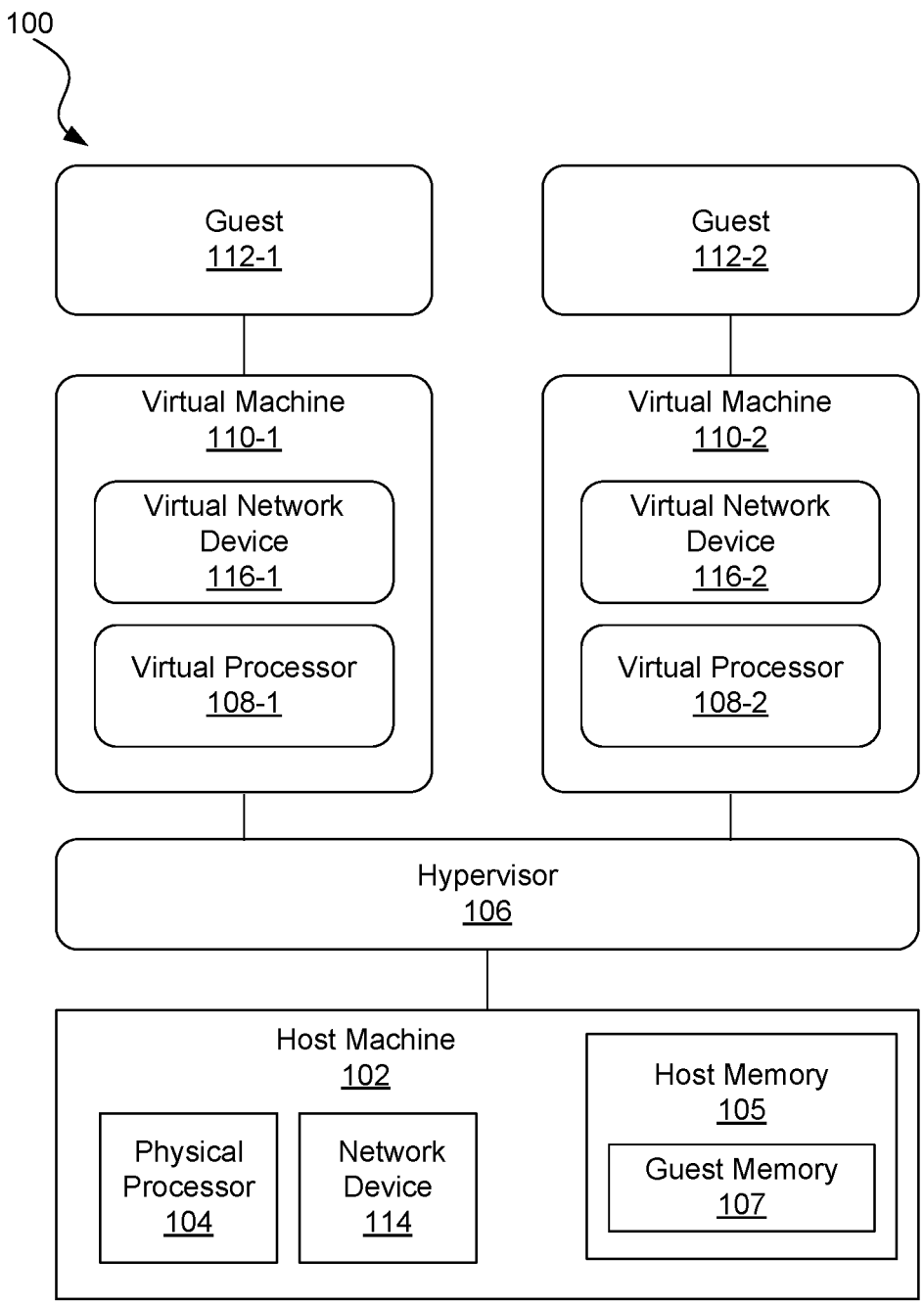
FIG. 1 is a diagram showing an illustrative host system running a plurality of virtual machines, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Virtual network devices may operate in trusted and untrusted modes. In trusted modes, guests are able to program the virtual network device with a datalink layer address or device address. In untrusted modes, the hypervisor programs the virtual network device with a device address such as a datalink layer address (e.g., Media Access Control (MAC) address). It is desirable to allow the guest to program the virtual network device, such as a virtual Network Interface Card (vNIC) without operating in trusted mode. For example, operating in trusted mode allows the guest to have unfettered access to the host. While this is advantageous in some scenarios, it may present various risks in scenarios in which the guest reliability may be unable to be determined. This may create vulnerabilities for the host system, as the host system may be unable to determine that a guest is unreliable and may attack the host system. Operating in untrusted mode prevents the guest from any access or flexibility with the system, which may constrain the existence of additional system features. Thus, a need exists for a more flexible security model for the guest.

An example solution may be a more finely grained security model, where guests may be provided with the opportunity to select a datalink layer address from a list of approved datalink layer addresses, without being given full freedom to assign any datalink layer address. For example, allowing the guest to have the ability to program the virtual network device allows for the existence of additional system features, such as allowing for bonding failover mode, where multiple virtual network devices are assigned the same datalink layer address, and also allowing multiple datalink layer addresses within one guest. By way of further example, this would allow a guest to select the Media Access Control address (MAC address) that is assigned to a vNIC associated with the guest. This presents the guests with greater flexibility, without compromising system security. As a result, by using the method and system as discussed below, the host system is still protected, while the guest has been given the ability to utilize additional system features.

FIG. 1 is a diagram showing an illustrative system 100 involving a plurality of virtual machines 110. According to the present example, a physical system, such as a host machine 102 includes hardware such as a processor 104 and a host memory 105. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102. As will be explained in further detail below, a host machine may support more than one hypervisor 106.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 refers to the working memory of the host system. Working memory is typically Random Access Memory (RAM) and is designed for speed. Working memory is often a volatile form of memory, meaning that it loses its data when power is no longer supplied. The host system 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The host memory 105 may designate various blocks of memory for use by the hypervisor 106 or for use by the guests 112 using the virtual machines 110. These blocks of memory may be ranges of physical memory addresses or virtual memory addresses. A certain portion of the host memory 105 is dedicated to guest memory 107. The total guest memory 107 may be made available for multiple guests 112 to use.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The host machine 102 further includes a network device 114. The network device 114 may be configured to communicate with a network through a variety of mechanisms such as wireless, Ethernet, or optical communications. Additionally, the virtual machines 110 may include virtual network devices 116-1, 116-2, where the hypervisor 106 maps the virtual network device 116 to the network device 114. The virtual network devices 116-1 and 116-2 may each include a datalink layer address such as a MAC address, and a logical address such as an Internet Protocol (IP) address.

Figure 2:
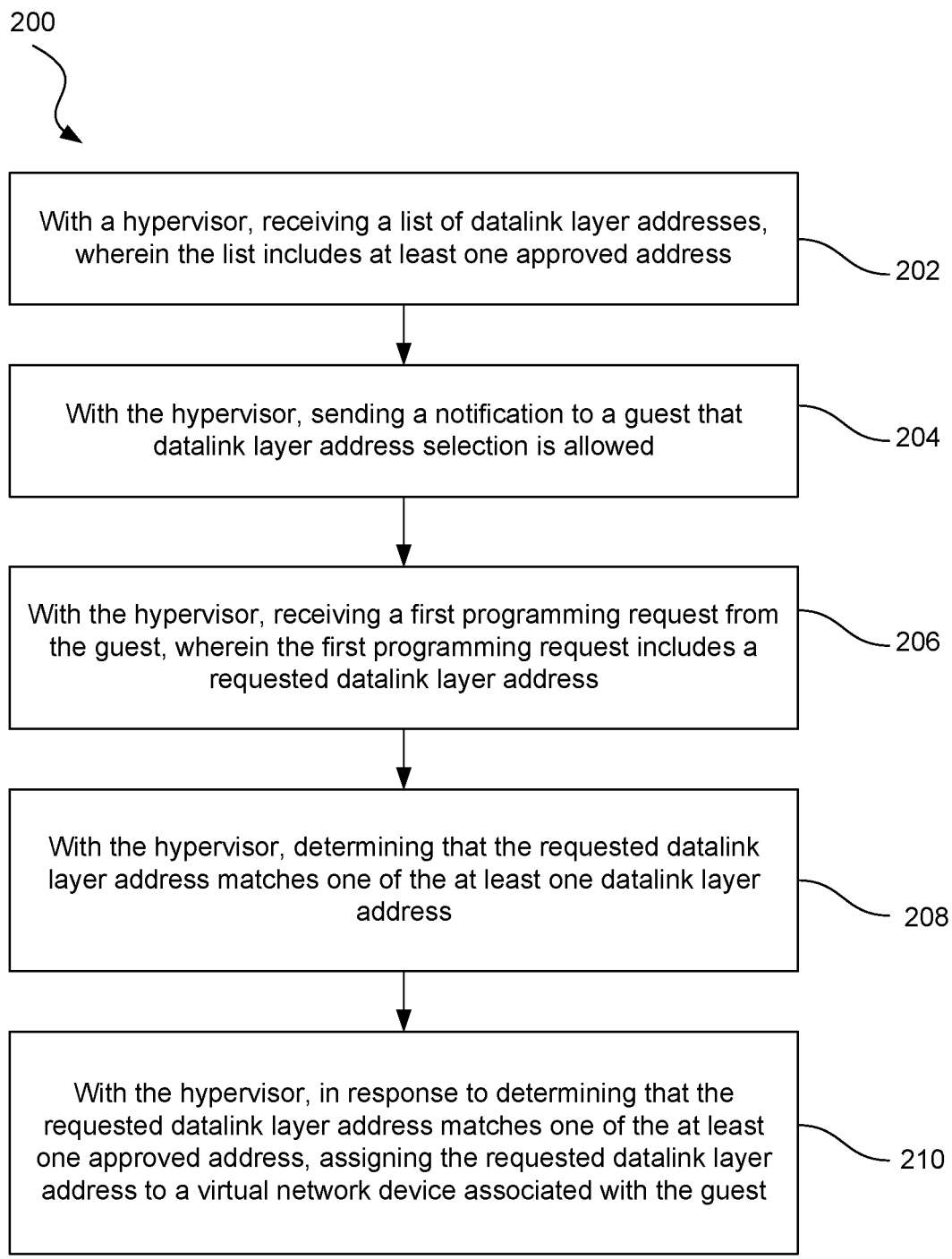
FIG. 2 is a flow diagram showing an illustrative method of a hypervisor assigning a requested datalink layer address to a virtual network device associated with the guest, according to one example of principles described herein.

FIG. 2 is a flow diagram of a method 200 of a hypervisor assigning a requested datalink layer address (also known as a "device address") to a virtual network device associated with the guest. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 202, the hypervisor receives a list of datalink layer addresses, wherein the list includes at least one approved address. The term "approved" address refers to an address that is on the list of datalink layer addresses. The datalink layer address may be a media access control address (MAC address). Additionally, for example, the MAC address may be used as a network address for most IEEE 802 network technologies, including, for example, Ethernet, Wi-Fi, and Bluetooth. For example, the datalink layer address may be a unique identifier assigned to a particular virtual network device to allow for the virtual network device to be mapped to the network device by the hypervisor, which allows for communications at the datalink layer of a network segment. By way of further example, each of the datalink layer addresses may correspond to a different virtual network device. For example, the datalink layer addresses may be assigned to the virtual network device by the manufacturer, or the datalink layer addresses may be assigned to the device by a network administrator. Additionally, the datalink layer address is not limited to a MAC address, as different network addresses, such as, different alphanumeric characters or an IP address, may be used as the datalink layer address.

Additionally, the list of datalink layer addresses may be received by the hypervisor from, for example, a host machine, a network administrator, a hypervisor administrator, or a combination of the three. For example, the host may send the list of datalink layer addresses to the hypervisor, where, for example, the list of datalink layer addresses was assigned by the manufacturer, by a network administrator, or by both. For example, the network administrator may override a default datalink layer address for a particular virtual network device by manually sending a different datalink layer address to the hypervisor, where the hypervisor will override the datalink layer address for the particular virtual network device with the datalink layer address received from the network administrator. By way of further example, the hypervisor administrator may provide the hypervisor with a list of approved datalink layer addresses.

At action 204, the hypervisor sends a notification to a guest that datalink layer address selection is allowed. For example, the hypervisor notifies the guest that MAC address programming, such as softmac, is allowed. Additionally, for example, the receipt of the list of datalink layer addresses may trigger the hypervisor to send the notification to the guest.

At action 206, the hypervisor receives a first programming request from the guest, wherein the first programming request includes a requested datalink layer address. For example, the guest may be triggered to send the first programming request by the receipt of the notification from the hypervisor that datalink layer address selection is allowed. By way of further example, the first programming request may be a softmac programming request. The first programming request may include a plurality of requested datalink layer addresses, or a single requested datalink layer address.

At action 208, the hypervisor determines that the requested datalink layer address matches one of the at least one datalink layer address. For example, the hypervisor validates that the requested datalink layer address contained in the first programming request matches a datalink layer address contained in the list of datalink layer addresses.

At action 210, the hypervisor, in response to determining that the requested datalink layer address matches one of the at least one approved address, assigns the requested datalink layer address to a virtual network device associated with the guest. For example, a MAC address that matches one of the MAC addresses in the list of MAC addresses may be programmed into the virtual network device so to allow communications between the guest and the virtual network device.

Figure 3A:
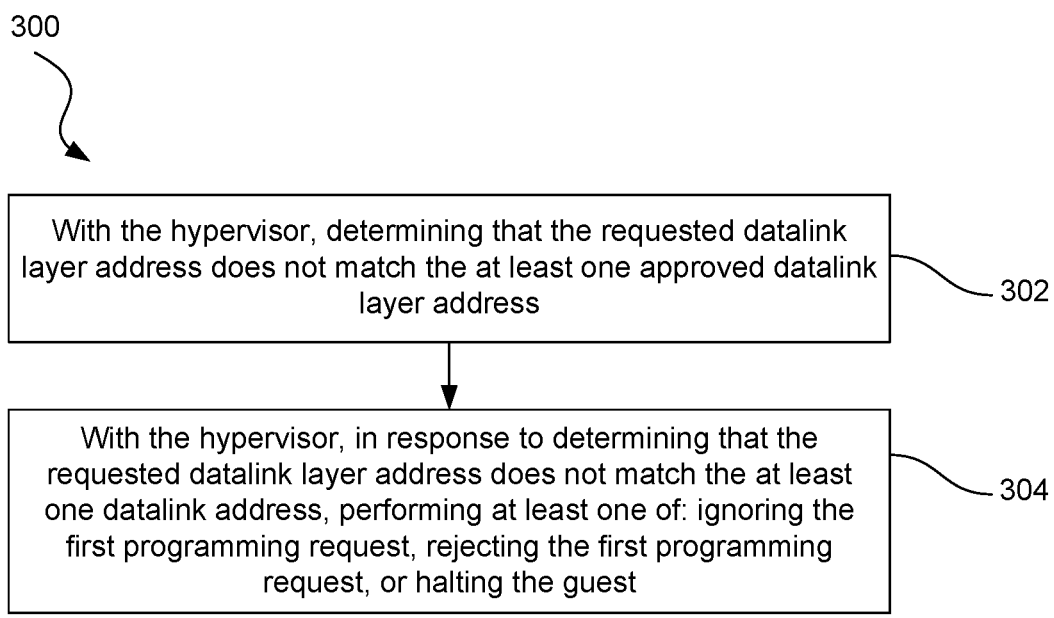
FIG. 3A is a diagram of two methods illustrating that the requested datalink layer address does not match the at least one approved datalink layer address as well as additional details of the datalink layer address, according to one example of principles described herein.

FIG. 3A is a diagram of two methods 300 and 308. Method 300 is a diagram for the hypervisor determining that the requested datalink layer address (also known as a "device address") does not match the at least one approved datalink layer address. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 302, the hypervisor determines that the requested datalink layer address does not match the at least one approved datalink layer address. For example, the hypervisor extracts the requested datalink layer address from the first programming request from the guest and compares the requested datalink layer address to all of the datalink layer addresses contained in the list of approved datalink layer addresses. By way of further example, if the list of approved datalink layer addresses does not contain the requested datalink layer address, the hypervisor then makes the determination that the requested datalink layer address does not match the at least one approved datalink layer address.

At action 304, the hypervisor, in response to determining that the requested datalink layer address does not match the at least one approved datalink layer address, performs at least one of: ignoring the first programming request, rejecting the first programming request, or halting the guest. For example, the hypervisor may ignore the first programming request because the requested datalink layer address contained in the first programming request does not match. The hypervisor may ignore the first programming request by doing nothing with the first programming request, or by doing nothing with the first programming request, but also sending a notification back to the guest that the first programming request was ignored. By way of further example, the notification may also request the guest to send another programming request that contains a different requested datalink layer address. Additionally, for example, the hypervisor may reject the first programming request by reporting to the guest that the requested datalink layer address does not match the at least one approved datalink address. The hypervisor may also ask the guest to send another requested datalink layer address. Furthermore, for example, the hypervisor may halt the guest upon determining that the requested datalink layer address does not match the at least one approved datalink address. By way of further example, the hypervisor may ask the guest to send another requested datalink layer address, and upon determining that the another requested datalink layer address matches one of the at least one approved datalink address, start the guest back up.

In some examples, the rejecting the first programming request includes sending a rejection notification to the guest. For example, the rejection notification may include a message from the hypervisor that the first programming request was rejected due to the requested datalink layer address not matching at least one approved datalink layer address. Additionally, for example, the rejection notification may also include a request for the hypervisor to send an additional programming request that includes a different requested datalink layer address. Furthermore, for example, the hypervisor may have a threshold of the number of times that a guest may send a requested datalink layer address before the hypervisor either halts the guest or assigns the guest a datalink layer address that corresponds to an address on the list of approved datalink layer addresses.

In some examples, the notification includes a suggested datalink layer address that matches at least one approved datalink layer address. For example, the notification may include a plurality of suggested datalink layer addresses, where in response to receiving the plurality of suggested datalink layer addresses, the guest may notify the hypervisor of a datalink layer address that it selected from the plurality of suggested datalink layer addresses. By way of further example, the notification may include only one suggested datalink layer address that matches at least one approved datalink layer address. Additionally, for example, upon receiving the one suggested datalink layer address, the guest may send an approval notification back to the hypervisor, approving the selection of the one suggested datalink layer address. Moreover, for example, upon receiving the one suggested datalink layer address, the guest may send a disapproval notification back to the hypervisor, disapproving of the selection of the one suggested datalink layer address. For example, the disapproval notification may include a new requested datalink layer address that is different from one suggested datalink layer address. By way of further example, upon receiving the disapproval notification with the new requested datalink layer address, the hypervisor may check to see if the new requested datalink layer address matches at least one of the approved datalink layer addresses. If there is a match, the hypervisor may proceed with assigning the new requested datalink layer address to the virtual network device assigned to the guest. If there is not a match, the hypervisor may choose to halt the guest, or to send either a rejection notification, or a notification that includes another suggested datalink layer address that matches at least one approved datalink layer address.

In some examples, the datalink layer address is a Media Access Control (MAC) address. For example, the MAC address may be used as a network address for most IEEE 802 network technologies, including, for example, Ethernet, Wi-Fi, and Bluetooth. For example, the MAC address may be a unique identifier assigned to a particular virtual network device, such as a virtual network interface card or a network interface controller, for communications at the datalink layer of a network segment. By way of further example, each of the MAC addresses may correspond to a different virtual network device, such as a virtual network interface card or a network interface controller. Moreover, the MAC address may be, for example, an Ethernet hardware address, a hardware address, or a physical address. For example, the MAC address may be assigned to the virtual network device, such as a virtual network interface card or a network interface controller, by the manufacturer, or the MAC address may be assigned to the device by a network administrator. Additionally, for example, the MAC address may be six groups of two hexadecimal digits, separated by hyphens, colons, or no separator.

In some examples, the at least one approved datalink layer address is identical to another datalink layer address on a network to which the virtual network device is connected. For example, the virtual network device many be connected to a network, such as, for example, a digital telecommunications network. By way of further example, the network may utilize a communication protocol for exchanging information over the network. Examples of the communication protocol may include, for example, IEEE 802 standards, Ethernet, Wireless LAN, TCP/IP, Bluetooth, and digital cellular standards, which may include GSM and UMTS standards. The virtual network device may have a unique identifier, such as, for example, a datalink layer address, which may allow for the network to communicate with the virtual network device. By way of further example, the datalink layer address of an available virtual network device may be an approved datalink layer address, in order to allow for the guest to select the datalink layer address to allow for communications over the network.

Figure 3B:
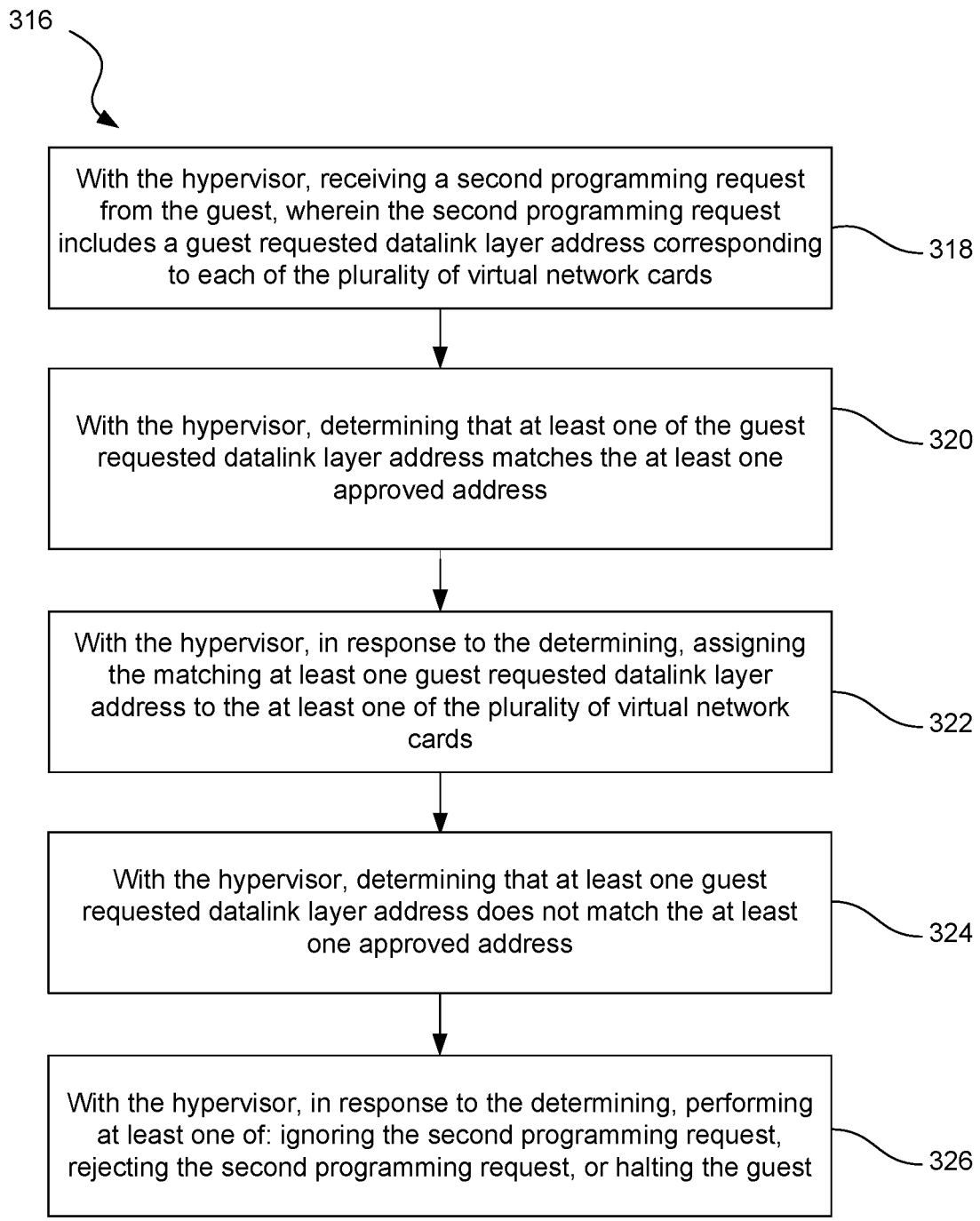
FIG. 3B is a diagram showing an illustrative a method for the hypervisor determining that a second programming request does not match at least one approved address, according to one example of principles described herein.

FIG. 3B is a diagram of method 316 for the hypervisor determining that a second programming request does not match at least one approved address. The method 316 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 318, the hypervisor receives a second programming request from the guest, wherein the second programming request includes a guest requested datalink layer address corresponding to each of the plurality of virtual network cards. For example, the guest may be triggered to send the second programming request by the receipt of the notification from the hypervisor that datalink layer address selection is allowed. By way of further example, the second programming request may be a softmac programming request. Additionally, for example, there may be a plurality of virtual network cards for which the guest seeks to request a datalink layer address. As a result, the second programming request may identify a number of guest requested datalink layer addresses, or the second programming request may identify a number of guest requested datalink layer addresses, as well as identify each virtual network card that each of the number of guest requested datalink layer addresses corresponds to.

At action 320, the hypervisor determines that at least one of the guest requested datalink layer addresses matches the at least one approved address. For example, the hypervisor validates that at least one of the guest requested datalink layer addresses contained in the second programming request matches an approved datalink layer address contained in the list of approved datalink layer addresses. By way of further example, there may be more than one guest requested datalink layer addresses that match at least one approved address, but not all of the guest requested datalink layer addresses may match at least one approved address.

At action 322, the hypervisor, in response to the determining, assigns the matching at least one guest requested datalink layer address to the at least one of the plurality of virtual network cards. For example, for each MAC address that matches one of the MAC addresses in the list of MAC addresses, that MAC address may be programmed into the virtual network device. By way of further example, if second programming request identified which virtual network device that the guest requested datalink layer address corresponds to, the hypervisor may assign the guest requested datalink layer address to the corresponding virtual network device, providing that the guest requested datalink layer address matches at least one guest requested datalink layer address. Moreover, for example, if the second programming request did not identify a corresponding virtual network device, the hypervisor may assign the matching at least one guest requested datalink layer address at random, providing that the at least one guest requested datalink layer address matches at least one approved address.

In some examples, each of the plurality of virtual network devices is bonded. For example, when at least two of the plurality of virtual network devices are bonded, the virtual network devices appear to be the same physical device, and as a result, one datalink layer address may be used for the at least two of the bonded virtual network devices.

At action 324, the hypervisor determines that at least one guest requested datalink layer address does not match the at least one approved address. For example, the hypervisor extracts the at least one guest requested datalink layer address from the second programming request from the guest and compares the at least one guest requested datalink layer address to all of the datalink layer addresses contained in the list of approved datalink layer addresses. By way of further example, if the list of approved datalink layer addresses does not contain the at least one guest requested datalink layer address, the hypervisor then makes the determination that the at least one guest requested datalink layer address does not match the at least one approved datalink layer address.

At action 326, the hypervisor, in response to the determining, performs at least one of: ignoring the second programming request, rejecting the second programming request, or halting the guest. For example, the hypervisor may ignore the second programming request because at least one guest requested datalink layer address contained in the second programming request does not match. The hypervisor may ignore the second programming request by doing nothing with the second programming request, by doing nothing regarding the at least one guest requested datalink layer address that does not match the at least one approved address, or by doing nothing with the second programming request, but also sending a notification back to the guest that the second programming request was ignored. By way of further example, the notification may also request the guest to send another programming request that contains a different guest requested datalink layer address. Additionally, for example, the hypervisor may reject the second programming request by reporting to the guest that at least one guest requested datalink layer address does not match the at least one approved datalink address. The hypervisor may also ask the guest to send another guest requested datalink layer address. Furthermore, for example, the hypervisor may halt the guest upon determining that the guest requested datalink layer address does not match the at least one approved datalink address. By way of further example, the hypervisor may ask the guest to send another guest requested datalink layer address, and upon determining that the another guest requested datalink layer address matches one of the at least one approved datalink address, start the guest back up.

Figure 4:
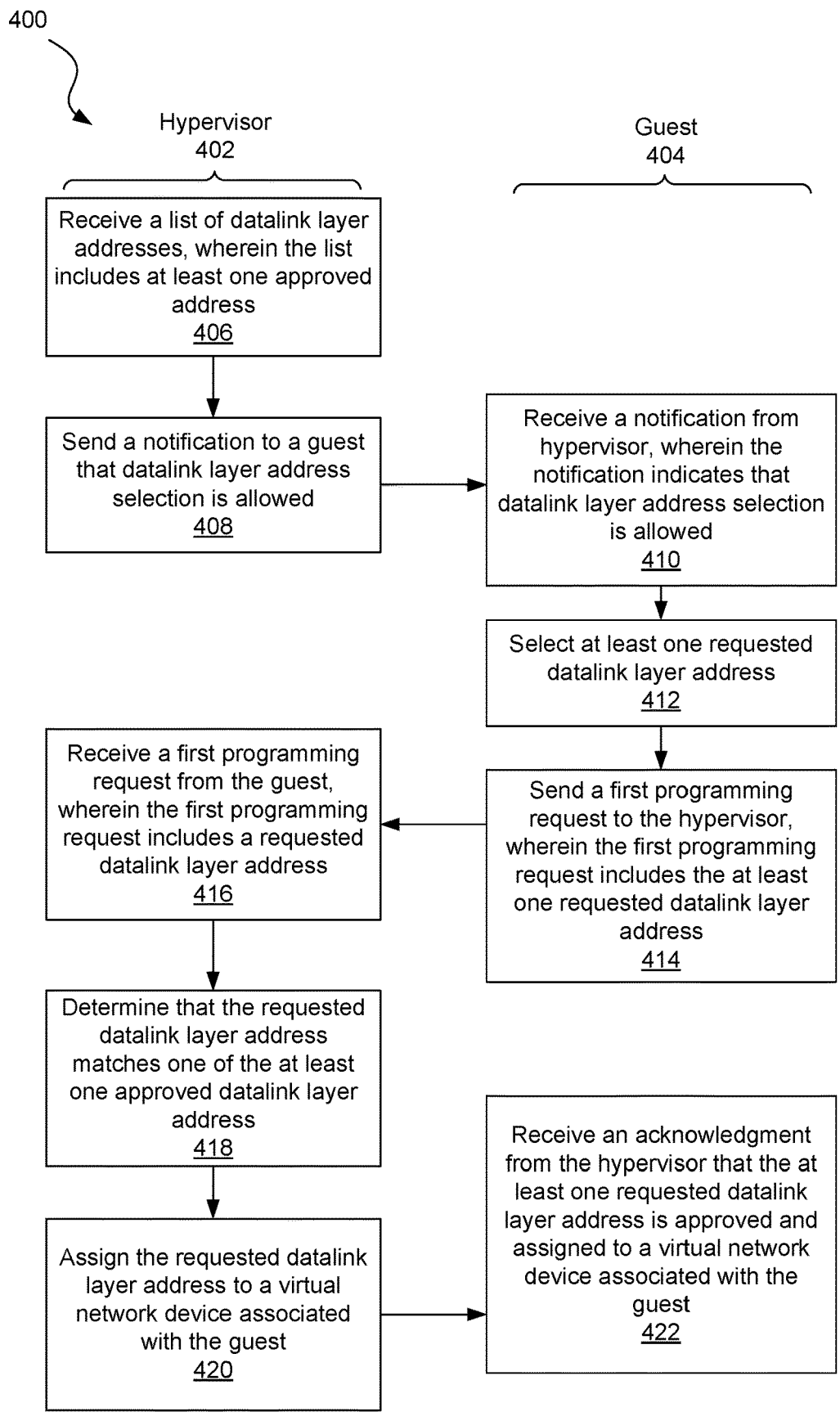
FIG. 4 is a diagram of a flowchart showing an illustrative method for assigning a requested datalink layer address to a virtual network device associated with the guest, according to one example of principles described herein.

FIG. 4 is a flowchart showing an illustrative method 400 for assigning a requested datalink layer address (also known as a "device address") to a virtual network device associated with the guest. According to the present example, the method 400 includes steps performed by the hypervisor 402 and steps performed by a guest 404. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

The method 400 includes a step 406 performed by the hypervisor 402 for receiving a list of datalink layer addresses, wherein the list includes at least one approved address. For example, the approved address may be a datalink layer address that is a unique identifier assigned to a particular virtual network device for communications at the datalink layer of a network segment. At step 408, the hypervisor 402 sends a notification to a guest that datalink layer address selection is allowed. For example, datalink layer address selection may be the ability for the guest to select which datalink layer address the guest would like to have assigned to a particular virtual network device.

At step 410, the guest 404 receives the notification from the hypervisor, wherein the notification indicates that datalink layer address selection is allowed. At step 412, the guest 404 selects at least one requested datalink layer address. For example, the guest may select at least one requested datalink layer address from a list that has been provided to the guest from the hypervisor or a system administrator. At step 414, the guest 404 may send a first programming request to the hypervisor, wherein the first programming request includes the at least one requested datalink layer address.

At step 416, the hypervisor 402 receives the first programming request from the guest, wherein the first programming request includes a requested datalink layer address. At step 418, the hypervisor 402 determines that the requested datalink layer address matches one of the at least one approved datalink layer address. At step 420, the hypervisor 402 assigns the requested datalink layer address to a virtual network device associated with the guest.

At step 422, the guest 404 receives an acknowledgment from the hypervisor that the at least one requested datalink layer address is approved and assigned to a virtual network device associated with the guest. For example, the acknowledgement may also indicate that the approval is based on the hypervisor determining that at least one guest requested datalink layer address matches the at least one approved datalink layer address included in the list of datalink layer addresses provided to the hypervisor. By way of further example, the guest may also receive a response from the hypervisor, in response to the hypervisor determining that the at least one requested datalink layer address does not match the at least one approved datalink layer address.

Figure 5:
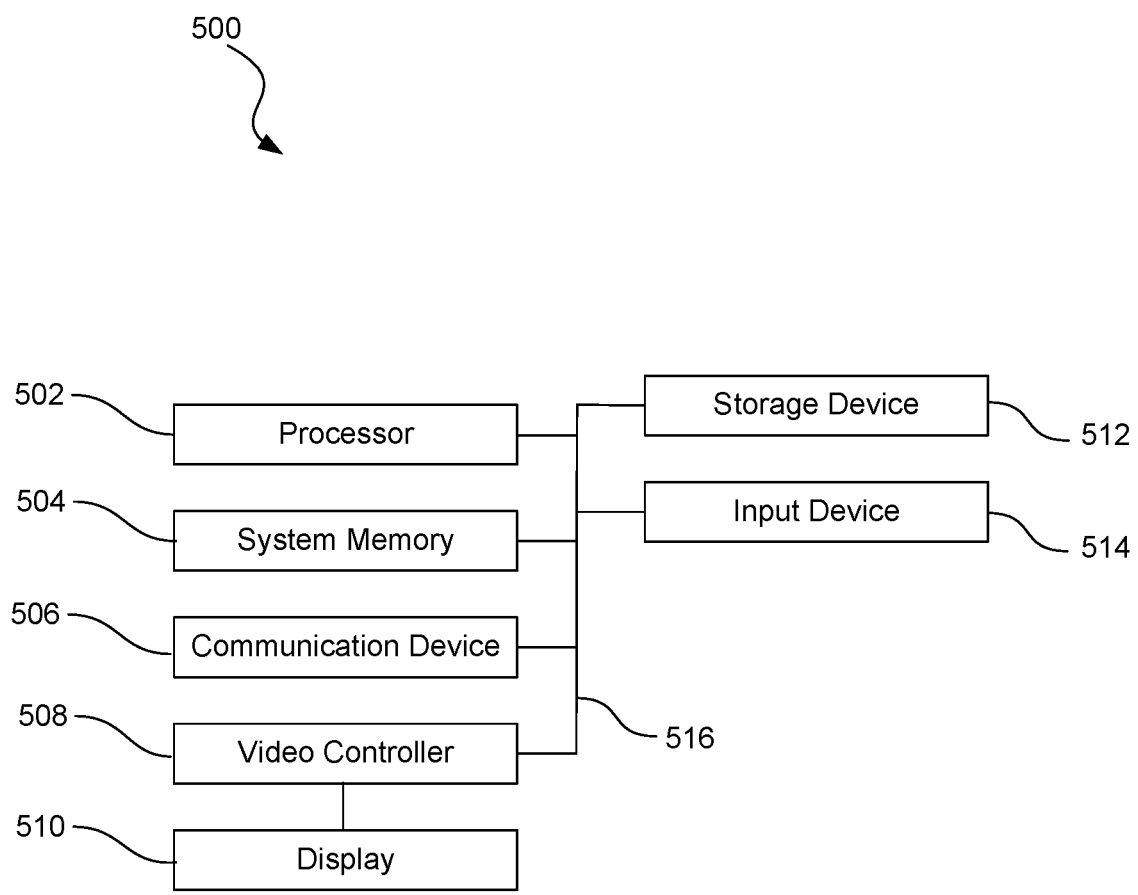
FIG. 5 is a diagram showing an illustrative computing system that may be used to perform the assigning of the requested datalink layer address, according to one example of principles described herein.

FIG. 5 is a diagram showing an illustrative computing system 500 that may be used to perform the assigning of the requested datalink layer address (also known as a "device address"). According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

The invention claimed is:

1. A method comprising:
    with a hypervisor that manages a guest on a host machine, receiving a list of device addresses, wherein the list includes a plurality of approved device addresses
    with the hypervisor, sending a notification to the guest that a device address selection is allowed, wherein the notification includes a suggested device address that matches at least one approved device address of the plurality of approved device addresses;
    with the hypervisor, receiving a first programming request from the guest disapproving selection of the suggested device address, wherein the first programming request includes a requested device address;
    with the hypervisor, determining that the requested device address matches another approved device address of the plurality of approved device addresses; and
    with the hypervisor, in response to determining that the requested device address matches the other approved device address of the plurality of approved device addresses, assigning the requested device address to a virtual network device associated with the guest.

2. The method of claim 1, further comprising:
    with the hypervisor, determining that the requested device address does not match the other approved device address of the plurality of approved device addresses; and
    with the hypervisor, in response to determining that the requested device address does not match the other approved device address of the plurality of approved device addresses performing at least one of: ignoring the first programming request, rejecting the first programming request, or halting the guest.

3. The method of claim 2, wherein rejecting the first programming request includes sending a rejection notification to the guest.

4. The method of claim 1, wherein the guest includes a plurality of virtual network devices.

5. The method of claim 4, further comprising:
with the hypervisor, receiving a second programming request from the guest, wherein the second programming request includes a guest requested device address corresponding to each of the plurality of virtual network cards;
with the hypervisor, determining that the guest requested device address matches the at least one approved device address; and
with the hypervisor, in response to the determining, assigning the matching guest requested device address to at least one of the plurality of virtual network cards.

6. The method of claim 5, wherein each of the plurality of virtual network devices is bonded.

7. The method of claim 5, further comprising: with the hypervisor, determining that the guest requested device address does not match the at least one approved device address; and
with the hypervisor, in response to the determining, performing at least one of: ignoring the second programming request, rejecting the second programming request, or halting the guest.

8. The method of claim 1, wherein the requested device address is a Media Access Control (MAC) address.

9. The method of claim 1, wherein the at least one approved device address is identical to another device address on a network to which the virtual network device is connected.

10. The method of claim 1, wherein the receiving the list of device addresses triggers the sending of the notification to the guest that device address selection is allowed.

11. A method comprising:
with a guest managed by a hypervisor running on a host machine, receiving a notification from the hypervisor, wherein the notification indicates that device address selection is allowed, wherein the notification includes a suggested device address that matches at least one approved device address included in a list of approved device addresses;
with the guest, selecting at least one requested device address;
with the guest, sending a first programming request to the hypervisor disapproving selection of the suggested device address, wherein the first programming request includes the at least one requested device address; and
with the guest, receiving an acknowledgment from the hypervisor that the at least one requested device address is approved and the at least one requested device address is assigned to a virtual network device associated with the guest, wherein the approval is based on the at least one requested device address matching another approved device address included in the list of approved device addresses.

12. The method of claim 11, further comprising:
with the guest, receiving a response from the hypervisor, in response to the hypervisor determining that the at least one requested device address does not match the other approved device address, wherein the response is at least one of: ignoring the first programming request, rejecting the first programming request, or halting the guest.

13. The method of claim 11, wherein the at least one requested device address is a Media Access Control (MAC) address.

14. The method of claim 11, wherein the guest includes a plurality of virtual network devices.

15. The method of claim 14, further comprising:
with the guest, sending a second programming request to the hypervisor, wherein the second programming request includes a guest requested device address for each of the plurality of virtual network devices; and
with the guest, receiving an acknowledgment from the hypervisor that at least one guest requested device address is approved and that the at least one guest requested device address is assigned to a corresponding virtual network device of the plurality of virtual network devices, wherein the approval of the at least one guest requested device address is based on the at least one guest requested device address matching the at least one approved device address included in the list of approved device addresses.

16. The method of claim 15, further comprising:
with the guest, receiving a response from the hypervisor, in response to the hypervisor determining that the at least one requested device address does not match the at least one approved device address.

17. A system comprising:
a processor; and
a memory comprising machine readable instructions that when executed by the processor, cause the system to:
receive, by a hypervisor, a list of device addresses, wherein the list includes a plurality of approved device addresses;
send, by the hypervisor, a notification to a guest supported by the system, wherein the notification indicates that device address selection is allowed, wherein the notification includes a suggested device address that matches at least one approved device address of the plurality of approved device addresses;
receive, by the hypervisor, a first programming request from the guest disapproving selection of the suggested device address, wherein the first programming request includes a requested device address;
determine, by the hypervisor, that the requested device address matches another approved device address of the plurality of approved device addresses; and
in response to determining that the requested device address matches the other approved device address of the plurality of approved device addresses, assign, by the hypervisor, the requested device address to a virtual network card associated with the guest.

18. The system of claim 17, wherein the requested device address is a Media Access Control (MAC) address.

19. The system of claim 17, wherein the at least one approved device address is identical to another device address on a network to which the virtual network device is connected.

20. The system of claim 17, wherein the receiving the list of device addresses triggers the sending of the notification to the guest.

* * * * *